US012123655B2

(12) United States Patent
Klausner et al.

(10) Patent No.: US 12,123,655 B2
(45) Date of Patent: Oct. 22, 2024

(54) THERMOCHEMICAL RENEWABLE ENERGY STORAGE

(71) Applicant: Board of Trustees of Michigan State University, East Lansing, MI (US)

(72) Inventors: James F. Klausner, Point Roberts, WA (US); Joerg Petrasch, Dornbirn (AT); Kelvin Randhir, San Diego, CA (US); Nima Rahmatian, San Diego, CA (US)

(73) Assignee: Board of Trustees of Michigan State University, East Lansing, MI (US)

( * ) Notice: Subject to any disclaimer, the term of this patent is extended or adjusted under 35 U.S.C. 154(b) by 0 days.

(21) Appl. No.: 18/238,579

(22) Filed: Aug. 28, 2023

(65) Prior Publication Data

US 2023/0408209 A1 Dec. 21, 2023

Related U.S. Application Data

(63) Continuation of application No. 17/363,541, filed on Jun. 30, 2021, now Pat. No. 11,754,346, which is a (Continued)

(51) Int. Cl.
*F28D 20/00* (2006.01)
*F28D 7/02* (2006.01)

(52) U.S. Cl.
CPC ............ *F28D 20/003* (2013.01); *F28D 7/024* (2013.01); *F28D 2020/0017* (2013.01)

(58) Field of Classification Search
CPC ....................... F28D 20/003; F28D 2020/0017
See application file for complete search history.

(56) References Cited

U.S. PATENT DOCUMENTS 8,938,966 B2 1/2015 Jockenhoevel et al.
9,966,171 B2 5/2018 Klausner et al.
(Continued)

FOREIGN PATENT DOCUMENTS

CN 116678246 A * 9/2023
EP 1213052 A1 6/2002

OTHER PUBLICATIONS

PCT International Preliminary Report on Patentability (Jan. 7, 2019).
(Continued)

*Primary Examiner* — Devon Russell
(74) *Attorney, Agent, or Firm* — Harness, Dickey & Pierce, PLC

(57) ABSTRACT

Systems and methods for energy storage and energy recovery are provided. An electrical-to-electrical energy storage system includes a thermochemical energy storage device, a blower, a compressor, a turbine, and an electrical generator. The TCES device includes a vessel, a porous bed, and a heater. The porous bed is disposed within an interior volume of the vessel. The porous bed comprises a reactive material. The reactive material is configured to release oxygen upon being heated to a reduction temperature, and generate heat when exposed to oxygen. The heater is in thermal contact with the reactive material. The blower is configured to remove oxygen from the interior volume. The compressor is configured to flow oxygen into the interior volume. The turbine is configured to receive a heated, oxygen-depleted gas from the interior volume. The generator is configured to be powered by the turbine to generate electricity.

36 Claims, 4 Drawing Sheets

10 11 16 36 72 74 50 32 34 52 38 40 42 44 12 46 18 14 20 30 66 64 70 76

Related U.S. Application Data continuation of application No. PCT/US2020/012551, filed on Jan. 7, 2020.

(60) Provisional application No. 62/789,169, filed on Jan. 7, 2019.

(56) References Cited

U.S. PATENT DOCUMENTS

| | | | |
|---|---|---|---|
| 10,107,268 | B1 | 10/2018 | Ambrosini |
| 11,754,346 | B2 | 9/2023 | Klausner et al. |
| 2006/0051643 | A1 | 3/2006 | Sarkar et al. |
| 2012/0122017 | A1 | 5/2012 | Mills |
| 2013/0251608 | A1 | 9/2013 | Chun et al. |
| 2014/0298822 | A1 | 10/2014 | Ma |
| 2015/0253039 | A1 | 9/2015 | Erickson et al. |
| 2017/0191697 | A1 | 7/2017 | Xiao et al. |
| 2018/0179914 | A1 | 6/2018 | Larochelle et al. |
| 2018/0204656 | A1 | 7/2018 | Klausner et al. |

OTHER PUBLICATIONS

Wokon, M., et al., "Investigations on thermochemical energy storage based on technical grade manganese-ire oxide in a lab-scale packed bed reactor," Solar Energy 153, pp. 200-214 (May 29, 2017).

Randhir, K., et al., "Magnesium-manganese oxides for high temperature thermochemical energy storage," J. of Energy Storage 21, pp. 599-610 (Dec. 31, 2018).

Sun, C., et al., "Cathode materials for solid oxide fuel cells: a review," J Solid State Electrochem, p. 1125-44 (Oct. 8, 2009).

Andrianov, M., et al., "Use of Lanthanum Chromite for Making Electric Heaters," D. I. Mendeleev Moscow Chemical—Technological Institute, pp. 592-596 (1980).

Randhir, K., et al., "Magnesioferrites for solar thermochemical fuel production," Solar Energy 163, p. 1-15 (2018).

Supplementary European Search Report and Written Opinion, EP Application No. 20738693.9 (Sep. 8, 2022).

Gallo, A., et al., "Energy storage in the energy transition context: A technology review," Renewable and Sustainable Energy Reviews, vol. 65, pp. 800-822 (Jul. 25, 2016).

Second EPO Office Action dated Dec. 20, 2023 for EPO application No. 20 738 693.9.

Saudi Arabian Office Action dated Oct. 2023 and English summary of same.

CN Office Action and Search Report dated Dec. 21, 2023 for corresponding CN application No. 2020800194320.

* cited by examiner

THERMOCHEMICAL RENEWABLE ENERGY STORAGE

CROSS-REFERENCE TO RELATED APPLICATIONS

This application is a continuation of U.S. patent application Ser. No. 17/363,541, filed Jun. 30, 2021 and issued as U.S. Pat. No. 11,754,346, which is a continuation of PCT patent application Serial No. PCT/US2020/012551, filed Jan. 7, 2020, which claims priority to U.S. provisional patent application Ser. No. 62/789,169, filed Jan. 7, 2019, all of which are incorporated by reference herein.

STATEMENT REGARDING FEDERALLY SPONSORED RESEARCH OR DEVELOPMENT

This invention was made with government support under DE-AR0000991 awarded by the U.S. Department of Energy. The government has certain rights in the invention.

BACKGROUND AND SUMMARY

The present disclosure relates to thermochemical renewable energy storage, and more particularly to a thermochemical energy storage device, and an electrical-to-electrical energy storage system and method.

Energy storage is generally used to accommodate daily and seasonal imbalances in energy consumption and production. Power generation from renewable sources, such as concentrated solar power ("CSP"), solar photovoltaics ("PV"), and wind turbines is inherently variable. Accordingly, renewable energy sources are best used in conjunction with energy storage systems that store energy when production exceeds demand, and release energy when demand exceeds production.

Some renewable energy systems, such as solar PV and wind, use batteries to store electrical energy. Other storage systems include pumped hydro, compressed air, and flywheels, among others. Other renewable energy systems, such as CSP, incorporate thermal energy storage ("TES"). CSP plants typically incorporate sensible heat storage using materials such as molten salts, oil, sand, rock, or other particulate materials. Molten salt energy storage can have energy densities ranging from 500 to 780 $MJm^{-3}$. TES systems typically operate at temperatures of less than 600° C., limiting the exergy and thereby the thermal-to-electric conversion efficiency.

Some renewable energy systems incorporate thermochemical energy storage ("TCES"); however, many TCES systems have poor reactive stability (i.e., ability to be reused for thousands of cycles with negligible degradation in performance), moderate volumetric energy densities, and/or low energy discharge temperatures.

In accordance with the present invention, a TCES device is provided. The TCES device includes a vessel, a porous bed, and a heater. The vessel defines an interior volume and includes a first opening and a second opening. The porous bed is disposed within the interior volume and is in fluid communication with the first and second openings. The porous bed comprises a reactive material. The reactive material is configured to release oxygen upon being heated to a reduction temperature, and generate heat when exposed to air or any oxygen-carrying gas and reacting with oxygen. The heater is configured to heat the reactive material. A further aspect provides an electrical-to-electrical energy storage system. The electrical-to-electrical energy storage system includes the TCES device, a blower, a compressor, a turbine, and an electrical generator. The blower is configured to remove oxygen from the interior volume of the TCES device when the reactive material is heated. The compressor is configured to provide air or any oxygen-containing gas to the interior volume of the TCES device. The turbine is configured to receive a heated, oxygen-depleted gas from the interior volume of the TCES device. The generator is configured to be powered by the turbine to generate electricity. Yet another aspect provides a method of storing energy and releasing energy using the electrical-to-electrical energy storage system.

The present TCES device is advantageous in that it operates at high temperatures, such as at least about 1000° C. in a preferred embodiment. Furthermore, the reactive material has a high reactive stability and a high volumetric energy density, such as at least about 1600 $MJm^{-3}$ in a preferred embodiment. The reactive material may be cheap, abundant, and accepting of impurities, making it practical to use in large-scale operations. In a preferred embodiment, the reactive material comprises a magnesium-manganese oxide. The TCES device may be sized and shaped according to standard shipping container dimensions, thereby facilitating ease of transport. The present electrical-to-electrical energy storage system includes the TCES device. The system can include multiple TCES devices to achieve a desired capacity.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
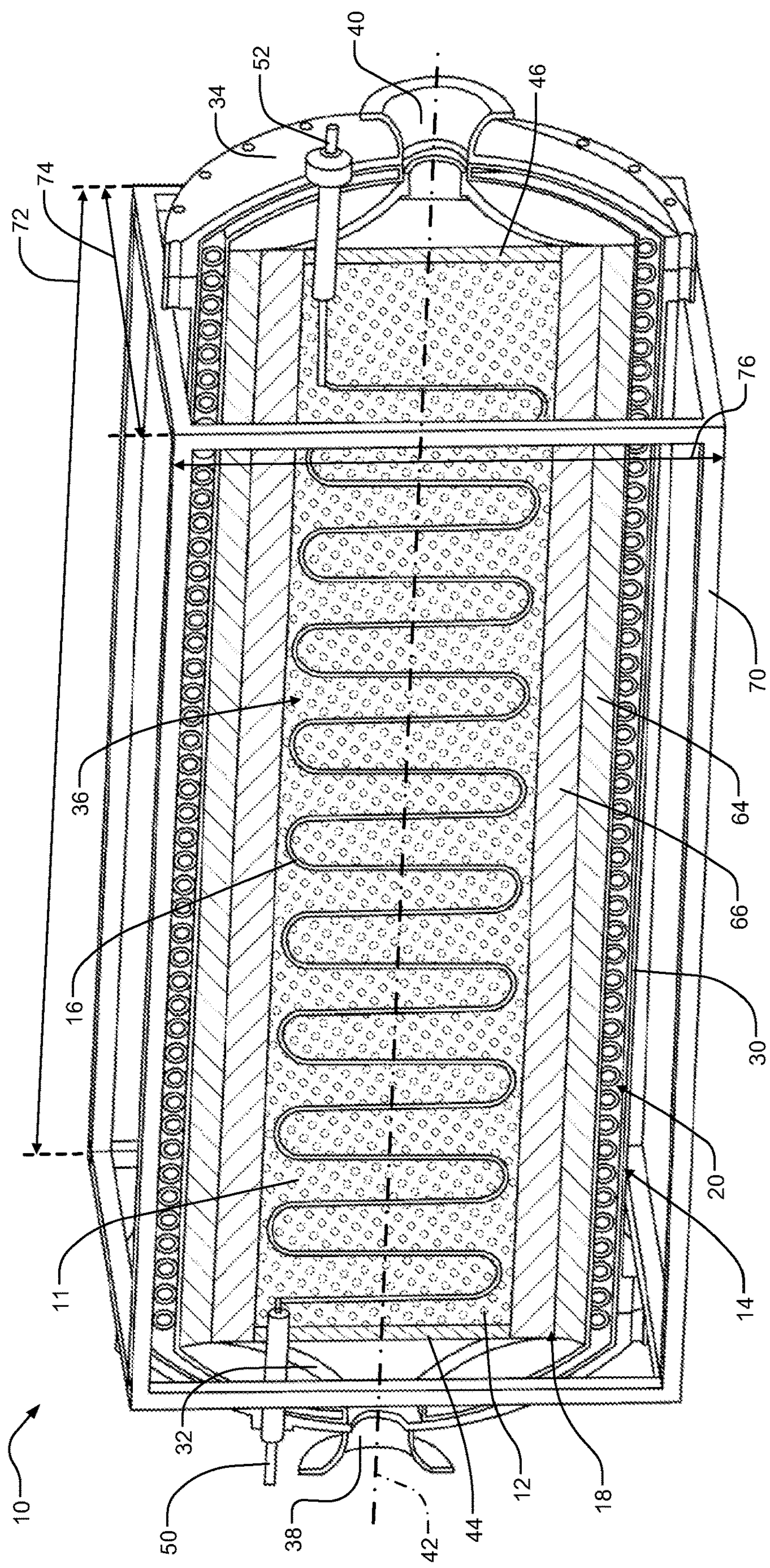
FIG. 1 is a partially fragmented perspective view showing an example embodiment the present TCES device.

A preferred embodiment of a TCES device 10 can be observed in FIG. 1. The TCES device 10 generally receives electricity, such as excess electricity generated by a renewable source, during an energy storage process and generates heat during an energy release process. The generated heat can be used together with high pressure air to generate electricity in a downstream component.

TCES Device

The TCES device 10 includes a bed 11 (also referred to as a "porous bed") comprising a reactive material 12, a vessel 14, a heater 16, insulation 18, and optionally a cooling system 20. The TCES device 10 is configured to store and release energy. In an energy storage process, the TCES device 10 receives electricity. The electricity is converted to high-temperature heat by the heater 16. The heater 16 heats the reactive material 12, causing the reactive material to undergo chemical reduction, thereby releasing oxygen and being converted to a reduced state. In the energy recovery process, the TCES device 10 receives oxygen. The reactive material 12 is exposed to the oxygen to cause the reactive material 12 to be oxidized, thereby generating heat.

Vessel

The vessel 14 includes a shell 30, a first end cap 32, and a second end cap 34. The shell 30 and the first and second end caps 32, 34 cooperate to at least partially define an interior volume 36. The first end cap 32 defines a first opening 38. The second end cap 34 defines a second opening 40. The first opening 38 and the second opening 40 are fluidly connected to the interior volume 36. The vessel 14 extends along a longitudinal axis 42. The longitudinal axis 42 may extend through the first opening 38 and the second opening 40. The shell 30 is substantially cylindrical. However, in alternative embodiments, the shell 30 may define other shapes.

The reactive material 12 is retained within the interior volume 36 of the vessel 14. For example, the shell 30 may cooperate with a first support 44 and a second support 46 to retain the reactive material 12. The first support 44 may be disposed adjacent to the first end cap 32 to form a physical barrier preventing the reactive material 12 from escaping through the first opening 38. Similarly, the second support 46 may be disposed adjacent to the second end cap 34 to prevent the reactive material 12 from escaping through the second opening 40. The first and second supports 44, 46 are permeable to fluids, such as air. The first and second supports 44, 46 may define substantially annular shapes. In one example, the first and second supports 44, 46 comprise a ceramic grit.

The vessel 14 may receive high-pressure gases, such as high-pressure air. Accordingly the vessel 14 is preferably a pressure vessel. In a preferred embodiment, the pressure vessel is configured to contain a gas having a pressure of at least about 20 bar. The pressure vessel may preferably comprise carbon steel. However, the pressure vessel 14 may additionally or alternatively comprise one or more of another steel, a stainless steel, a nickel alloy, a steel super alloy, a titanium alloy, an oxide-dispersion-strengthened alloy, an Inconel alloy, and a HAYNES® alloy.

Heater

The heater 16 is configured to heat the reactive material 12. Thus, the heater 16 is in thermal contact with the reactive material 12, or is configured to be in thermal contact with the reactive material 12. In an example embodiment, the heater 16 is a heating element that is embedded in the reactive material 12. The heating element is sized and shaped to heat substantially all of the reactive material 12. Accordingly, the heating element spans an entire length of the interior volume 36. The heating element spans at least about 75% of a diameter of the interior volume 36, optionally at least about 80%, optionally at least about 85%, optionally at least about 90%, and optionally at least about 95%.

In some embodiments, the heating element defines a serpentine shape between a first end 50 and a second end 52. The heating element intersects a central longitudinal plane of the interior volume 36. However, the heating element may optionally define alternative shapes and/or configurations within the interior volume 36. The heating element may alternatively extend in multiple radial directions or define a coil, for example. The first end 50 extends through the first end cap 32 and the second end 52 extends through the second end cap 34. The first and second ends 50, 52 are configured to be electrically connected to an electricity source (see, e.g., electricity source 120 of FIGS. 2 and 3).

The heating element comprises a material that can withstand high temperatures, such as temperatures of at least about 1000° C., optionally at least about 1100° C., optionally at least about 1200° C., optionally at least about 1300° C., optionally at least about 1400° C., optionally at least about 1500° C., and preferably at least about 1600° C. In a preferred embodiment, the heating element is a resistive heating element. The resistive heating element may comprise a molybdenum disilicide. However, in alternative embodiments, the resistive heating element may comprise lanthanum chromite or zirconia.

Figure 2:
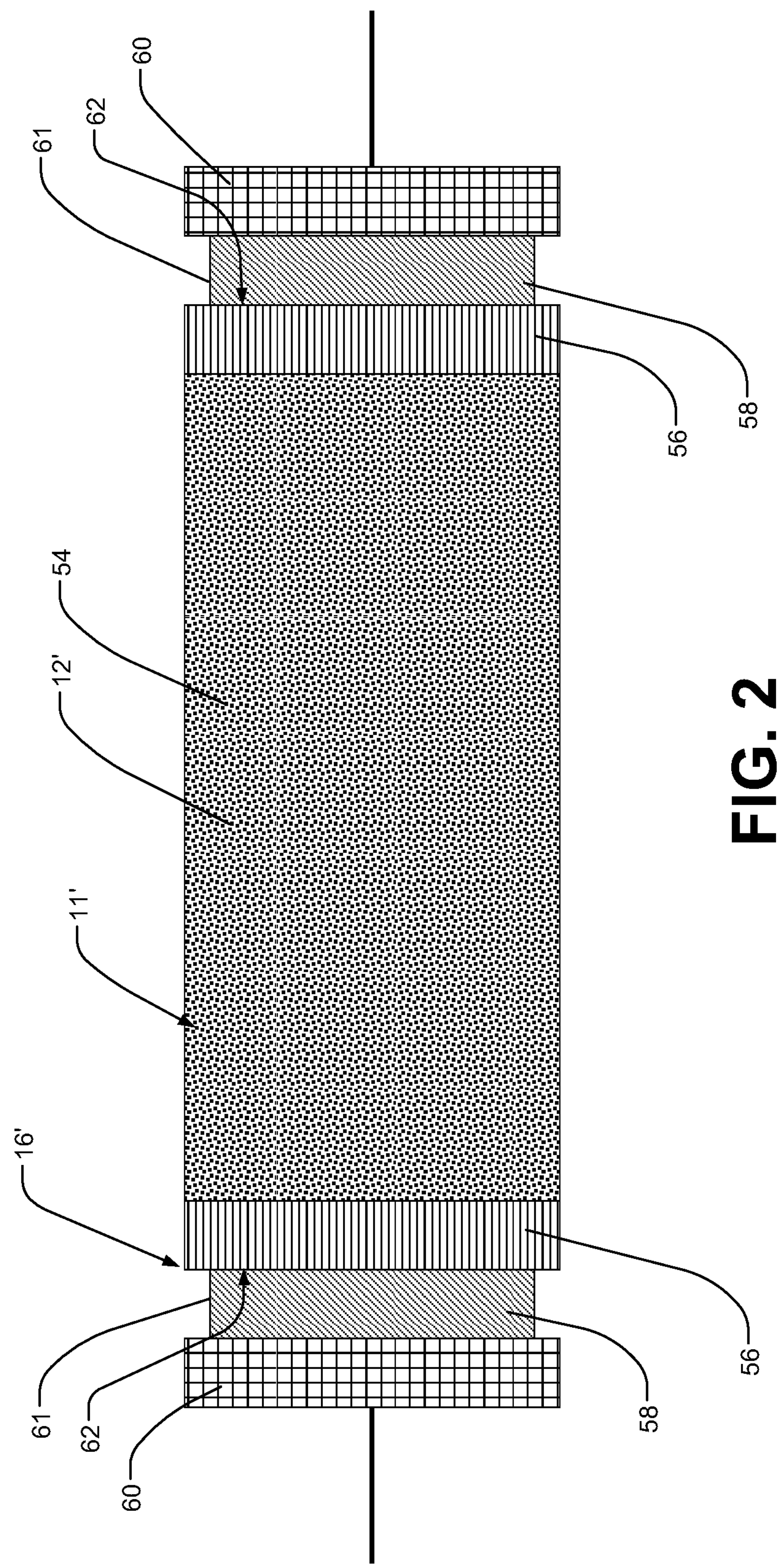
FIG. 2 is a partial schematic view showing an example embodiment of a heater and a reactive material of the present TCES device.

In a preferred example embodiment, such as when the reactive material 12 is electrically conductive, the heater 16 is configured for bulk resistive heating of the bed 11. Bulk resistive heating is preferable when the reactive material 12 is electrically conductive, at least at certain temperatures. With reference to FIG. 2, an example embodiment of a heater 16' is configured for bulk resistive heating of a porous bed 11' including a reactive material 12'. The heater 16' and the reactive material 12' may be included in a TCES device similar to the TCES device 10 of FIG. 1.

The bed 11' is electrically conductive at certain temperatures, such as at temperatures greater than or equal to about 600° C. In addition to the reactive material 12', the bed 11' may optionally include one or more additional components 54 to reduce or prevent formation of instabilities due to preferential electrical pathways and localized hot spots. The additional components 54 may have different electrical properties than the reactive materials 12'. More particularly, in a preferred embodiment, the additional components 54 may have a higher electrical conductivity than the reactive material 12', a relatively higher electrical conductivity that decreases as temperature increases, and/or a less-temperature-dependent electrical conductivity than the reactive material 12'. The additional components 54 may be in the form of pellets, rods, and/or one or more interlinking structures, for example.

The heater 16' comprises a pair of first or inner electrodes 56 and a pair of second or outer electrodes 58. Each inner electrode 56 is disposed between the reactive material 12' and a respective outer electrode 58. Each outer electrode 58 may be disposed between a respective conductive component 60 and inner electrode 56. The electrodes 56, 58 are configured such that fluid can flow through the electrodes 56, 58 and/or past the electrodes 56, 58 within the TCES device. For example, the electrodes 56, 58 may be porous, have apertures extending therethrough, and/or have dimensions smaller than an inner vessel dimension so that fluid may flow past an electrode periphery. In the embodiment shown in FIG. 2, the inner electrodes 56 include pores or apertures that permit flow therethrough. The outer electrodes 58 are in the form of respective rods having reduced diameters such that fluid can flow around peripheries 61 of the outer electrodes 58. In another embodiment, an outer electrode is in the form of pellets supported by a wire mesh conductive element.

The conductive component 60 may comprise wire mesh or electrical clamps, by way of example. Wire mesh may include a resistance wire, such as nichrome. Electrical clamps may be formed from a high-temperature alloy. The electrodes 56, 58 may be electrically connected to an AC or DC voltage source via the conductive component 60.

In some embodiments, each inner electrode 56 may comprise a plurality of inner electrodes 56. Each outer electrode 58 may comprise a plurality of outer electrodes 58. The pluralities of inner and outer electrodes 56, 58 may be in a form of electrically-disconnected segments to facilitate changing electrical boundary conditions during heating of the bed 11'. Electrical boundary conditions may be changed by switching voltages between segments, for example. Changing electrical boundary conditions during heating may reduce or avoid formation of instabilities due to preferential pathways with high temperature and high electrical conductivity.

The inner and outer electrodes 56, 58 comprise ceramic materials. More particularly, the inner electrode 56 comprises a first ceramic material and the outer electrode 58 comprises a distinct second ceramic material. The use of ceramic materials in the heater 16' provides advantages over the use of metal materials. For example, unlike many metals, the first and second ceramic materials are not subject to the formation of metal oxides, even in high-temperature (e.g., greater than or equal to about 600° C.) and high-oxygen-partial-pressure environments. Metal oxide formation is undesirable because it generally has a high resistance that inhibits electric current.

The first ceramic material of the inner electrode 56 generally has a high chemical stability and a low electrical resistivity at high temperatures. The first ceramic material is nonreactive with the reactive material 12'. In a preferred embodiment, the first ceramic material has the chemical formula $La_{1-x}A_xCrO_3$, where A is selected from the group consisting of Mg, Ca, Sr, Ba, or combinations thereof; and x ranges from 0-0.1. In one example embodiment, x is 0 and the first ceramic material comprises $LaCrO_3$. The first ceramic material may alternatively comprise a non-lanthanum oxide, such as $ZrO_2$.

The first ceramic material may have a relatively higher electrical resistivity at low temperatures compared to high temperatures (e.g., on the order of 100 Ω-m). Accordingly, the outer electrode 58 is arranged on the colder side 62 (i.e., outer) of the inner electrode 56 to reduce or minimize heat loss on the colder side 62. The second ceramic material of the outer electrode 58 therefore has a lower electrical resistivity (e.g., on the order of $10^{-}$Ω-m) than the first ceramic material and a high electrical conductivity.

The second ceramic material may comprise a cathode material for solid oxide fuel cell applications. Examples of such cathode materials are described in Sun, C., Hui, R. & Roller, J., "Cathode materials for solid oxide fuel cells: a review," J Solid State Electrochem 14, 1125-44 (2010) doi:10.1007/s10008-009-0932-0. In a preferred embodiment, the second ceramic material may have the chemical formula $B_{1-y}C_yDO_3$, where B is selected from the group consisting of La, Ce, Pr, Nd, Pm, Sm, Eu, Gd, Tb, Dy, Ho, Er, Tm, Yb, Lu, Al, Sc, Ti, Y, Zr, Hf, or combinations thereof; C is selected from the group consisting of Sr, Ba, or a combination thereof; D is selected from the group consisting of Co, Mn, Ni, Fe, or combinations thereof; and y ranges from about 0.3-0.6. In a preferred embodiment, B comprises La. In an example embodiment, the second ceramic material comprises lanthanum strontium cobaltite (LSC) having the chemical formula $La_{0.7}Sr_{0.3}CoO_3$.

A TCES device may optionally include more than one type of heater. In at least one example embodiment, a TCES device includes first heater comprising a resistive coil and a second heater comprising ceramic electrodes (e.g., the heater 16' of FIG. 2). In one example, the resistive coil comprises nichrome and is wrapped around a periphery of the reactive material bed. The first heater may be used to preheat the bed (e.g., to a temperature at which the bed has a threshold electrical conductivity, such as about 600° C. for some reactive materials), and then the second heater may be used to further increase a temperature of the bed. Alternatively, the bed may be preheated by passing a hot gas stream over the bed, which has been previously heated with an external gas heater.

Returning to FIG. 1, the heater 16 may be an alternative type of heater that is capable of receiving electricity and heating the reactive material. The heater 16 may comprise a plurality of heaters disposed to heat substantially all of the reactive material 12. In one example, the heater 16 comprises one or more arc heaters.

Insulation

The insulation 18 is disposed along an inside of the shell 30 to limit heat transfer from the reactive material 12 to the shell 30. As described above, the vessel 14 preferably withstands high pressures. Accordingly, insulation 18 is provided to prevent the vessel 14, and particularly the shell 30, from becoming soft and having reduced structural integrity when the reactive material 12 is hot. The insulation 18 may facilitate a temperature drop between the reactive material 12 and the shell 30 when the reactive material is hot, thereby minimizing heat loss from the vessel 14.

In a preferred embodiment, the insulation 18 includes a first or outer insulation layer 64 and a second or inner insulation layer 66. The inner insulation layer 66 is disposed adjacent to the reactive material 12. The outer insulation layer 64 is disposed circumferentially between the inner insulation layer 66 and the shell 30. In alternative embodiments, the insulation 18 may comprise a single layer, or more than two layers (e.g., three layers or four layers).

The insulation 18 comprises a material having a low thermal conductivity. In a preferred embodiment, the outer insulation layer 64 includes refractory bricks, preferably comprising aluminum and/or calcium aluminate. The refractory bricks of the outer insulation layer 64 may additionally or alternatively comprise zirconia and/or magnesium aluminate. In other embodiments, the outer insulation layer 64 may comprise a non-refractory brick material. The inner insulation layer 66 preferably comprises a microporous insulating material. The microporous insulating material of the inner insulation layer 66 may preferably comprise microporous alumina and/or microporous silica. The inner insulation layer 66 may additionally or alternatively comprise alumina, fibrous zirconia, and/or microporous zirconia.

A thickness of the insulation 18 is dependent upon a size of the TCES device 10, an operating temperature of the TCES device 10, and characteristics of the shell 30 (e.g., melting point, thickness). In one example, the TCES device 10 is approximately the size of a standard shipping container (e.g., 40'x8.5'8'), is configured to operate at temperatures of at least about 1500° C., and has the shell 30 comprising carbon steel. The outer insulation layer 64 has a thickness of about 20 cm and the inner insulation layer 66 has a thickness of about 9 cm.

Cooling System

The cooling system 20 can be operated to reduce a temperature of the TCES device 10, such as when the insulation alone is insufficient to maintain the shell 30 below its melting point. The cooling system 20 is disposed circumferentially between the outer insulation layer 64 and the shell 30. In a preferred embodiment, the cooling system 20 includes one or more circumferentially disposed tubes for circulating a heat transfer fluid. In one example, the heat transfer fluid is air. However, other heat transfer fluids that are effective at an operating temperature of the TCES device 10 may alternatively be employed. The cooling system 20 may include other types of cooling systems that are capable of maintaining the shell 30 below its melting point. In some embodiments, the cooling system 20 is altogether omitted.

Frame

The TCES device 10 may be supported by and contained within a support frame 70. The support frame 70 has a substantially rectangular prism shape. The support frame 70 includes bars along each edge and open faces between the bars. In a preferred embodiment, the support frame 70 defines standard shipping container outer dimensions. In an example, the support frame 70 may define a length 72 of about 40 feet, a width 74 of about 8 feet, and a height 76 of about 8.5 feet. Accordingly, the TCES device 10 may be readily transported.

Reactive Materials

The reactive material 12 of the bed 11 preferably has a high reactive stability (i.e., the ability to reuse the reactive material 12 for thousands of cycles with negligible degradation in performance), high discharge temperature, and high energy density. The reactive material 12 is configured to release oxygen upon being heated to a reduction temperature, and generate heat when exposed to oxygen. More particularly, the reactive material 12 is a redox material that undergoes oxidation and reduction reactions to change phase. During an energy storage process, the reactive material 12 consumes heat to undergo reduction and release oxygen. During an energy release process, the reactive material 12 consumes oxygen to undergo oxidation and generate heat. The reactive material 12 advantageously uses oxygen as a gaseous reactant, rather than $CO_2$, $H_2$, or CO, by way of example. The oxygen for the process may come from air.

The bed 11 of the reactive material 12 can be a packed bed or porous bed. In a preferred embodiment, the bed 11 is a packed bed including a plurality of granular particles. An average particle size ranges from about 100 μm-8 mm. In one embodiment, particle sizes range from about 125-180 μm. The average particle size can be optimized to increase energy density.

The particles define an interparticle pore size between particles. The particles preferably also define an intraparticle pore size within the particles, so that the bed 11 has a dual porosity. The average interparticle pore size ranges from about 1-8 mm. In some embodiments, the average interparticle pore size is optionally about 1-2 mm, optionally about 2-3 mm, optionally about 3-4 mm, optionally about 4-5 mm, optionally about 5-6 mm, optionally about 6-7 mm, or optionally about 7-8 mm. The average intraparticle pore size ranges from about 10-100 μm. In some embodiments, the average intraparticle pore size is optionally about 10-20 μm, optionally about 20-30 μm, optionally about 30-40 μm, optionally about 40-50 μm, optionally about 50-60 μm, optionally about 60-70 μm, optionally about 70-80 μm, optionally about 80-90 μm, or optionally about 90-100 μm.

A total porosity of the bed 11 (both interparticle and intraparticle) is less than or equal to about 75%, optionally less than or equal to about 70%, optionally less than or equal to about 65%, optionally less than or equal to about 60%, optionally less than or equal to about 55%, optionally less than or equal to about 50%, optionally less than or equal to about 45%, optionally less than or equal to about 40%, and optionally less than or equal to about 35%. The total porosity may be optimized depending on acceptable pressure drop. In one embodiment, pressure drop is about 0.05 bar.

The porosity of the bed 11 can be decreased to increase energy density. A volumetric energy density of the bed 11 is at least about 1000 $MJm^{-3}$, optionally at least about 1100 $MJm^{-3}$, optionally at least about 1200 $MJm^{-3}$, optionally at least about 1300 $MJm^{-3}$, optionally at least about 1400 $MJm^{-3}$, optionally at least about 1500 $MJm^{-3}$ optionally at least about 1600 $MJm^{-3}$, optionally at least about 1700 $MJm^{-3}$, optionally at least about 1800 $MJm^{-3}$, optionally at least about 1900 $MJm^{-3}$, optionally at least about 2000 $MJm^{-3}$, optionally at least about 2100 $MJm^{-3}$, optionally at least about 2200 $MJm^{-3}$ optionally at least about 2300 $MJm^{-3}$, optionally at least about 2400 $MJm^{-3}$, optionally at least about 2500 $MJm^{-3}$, optionally at least about 2600 $MJm^{-3}$, optionally at least about 2700 $MJm^{-3}$, and optionally at least about 2800 $MJm^{-3}$. A specific energy density may be at least about 900 $kJkg^{-1}$, and optionally at least about 1000 $kJkg^{-1}$.

The reactive material 12 may comprise a metal oxide, which may be a metal-metal oxide. In some embodiments, the reactive material 12 is formed from a transition metal oxide and an alkaline earth metal oxide that acts as a sintering inhibitor. In a preferred embodiment, the reactive material 12 comprises a magnesium-manganese oxide. In alternative embodiments, the reactive material 12 may comprise a perovskite such as doped calcium manganite or lanthanum strontium cobalt ferrite. The reactive material 12 may further comprise a dopant to increase energy density, such as cobalt, iron, chromium, molybdenum, vanadium, zinc, cerium, and/or nickel.

Reactive Materials: Magnesium-Manganese Oxides

Magnesium oxide (MgO) and manganese oxide (MnO) react to form magnesium-manganate spinel ($MgMn_2O_4$) (both cubic and tetragonal) when heated in the presence of oxygen (e.g., from air). A molar ratio of manganese to magnesium can be adjusted for a specific operating temperature range to obtain high reactive stability. In general, increasing an amount of magnesium decreases slag formation (inhibiting undesirable sintering of the reactive material 12 when heated) and facilitates operation of the TCES device 10 at higher temperatures. The molar ratio ranges from about 1:4-4:1, optionally about 1:2-3:1, and optionally about 2:3-2:1. The molar ratio is optionally about 2:3, optionally about 1:1, or optionally about 2:1.

Reactive materials 12 comprising magnesium-manganese oxides have desirably high exergetic efficiencies via high operating temperatures, low cost, fast reaction kinetics, and the use of air as the reacting gas for discharging heat, thereby eliminating the need for gas storage-and-management systems. Magnesium-manganese oxides do not require very low partial pressures of oxygen to achieve high energy densities, making use of magnesium-manganese oxides in the TCES device 10 practical for large-scale operation.

Reactive materials 12 comprising magnesium-manganese oxides have a high degree of reactive stability under high-temperature cycling, such as between 1000° C. and 1500° C., and optionally between 1200° C. and 1500° C. Furthermore, magnesium-manganese oxide-containing reactive materials 12 undergo phase change reactions at high operating temperatures, such as at least about 1000° C., optionally at least about 1100° C., optionally at least about 1200° C., optionally at least about 1300° C., optionally at least about 1400° C., optionally at least about 1500° C., and preferably at least about 1600° C. The magnesium-manganese oxide reactive materials 12 may have volumetric energy densities of at least about 1000 $MJm^{-3}$, optionally at least about 1100 $MJm^{-3}$, optionally at least about 1200 $MJm^{-3}$, optionally at least about 1300 $MJm^{-3}$, optionally at least about 1400 $MJm^{-3}$, optionally at least about 1500 $MJm^{-3}$, optionally at least about 1600 $MJm^{-3}$, optionally at least about 1700 $MJm^{-3}$, optionally at least about 1800 $MJm^{-3}$, optionally at least about 1900 $MJm^{-3}$, optionally at least about 2000 $MJm^{-3}$ optionally at least about 2100 $MJm^{-3}$, optionally at least about 2200 $MJm^{-3}$, optionally at least about 2300 $MJm^{-3}$, optionally at least about 2400 $MJm^{-3}$, optionally at least about 2500 $MJm^{-3}$, optionally at least about 2600 $MJm^{-3}$, optionally at least about 2700 $MJm^{-3}$ and optionally at least about 2800 $MJm^{-3}$. A specific energy density may be at least about 900 $kJkg^{-1}$, and optionally at least about 1000 $kJkg^{-1}$.

As noted above, magnesium oxide and manganese oxide react to form magnesium-manganate spinel (both cubic and tetragonal) when heated in air or oxygen. The crystal structure of a spinel phase can be viewed as a face-centered cubic ("FCC") lattice of oxygen ions with cations at tetrahedral and octahedral sites. $MgMn_2O_4$ is a tetragonal spinel at room temperature. At high temperatures (e.g., at least about 780° C., optionally at least about 800° C., optionally at least about 850° C., optionally at least about 900° C., and optionally at least about 950° C.), it undergoes an allotropic transformation to form a cubic spinel. The heat of formation of $MgMn_2O_4$ from MgO and $Mn_2O_3$ using high-temperature solution has been reported to be about −11.4 $kJmol^{-1}$. An enthalpy of transformation between the cubic spinel and tetragonal spinel is about 20.9 $kJmol^{-1}$ at 850° C.

The chemical reactions of magnesium-manganese oxide as the reactive material 12 are described below. Magnesium-manganese oxide spinel is of the form $(Mg_{1-x}Mn_x)_{3-\delta}O_4$. Here, $\delta$ is the cation vacancy concentration in the spinel and x is the manganese-to-magnesium molar ratio. The non-stoichiometric reaction for reduction of a magnesium-manganate spinel is given by

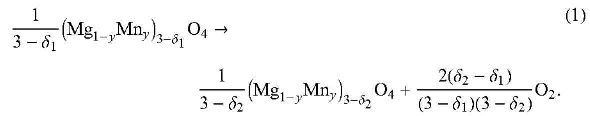

Here, the cation vacancy concentration in the spinel changes from $\delta_1$ to $\delta_2$ as the spinel loses oxygen.

The transformation of the non-stoichiometric spinel phase to non-stoichiometric monoxide phase $(Mg_{1-y}Mn_y)_{1-\delta*}O$ is given by

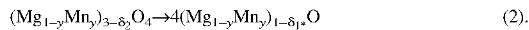

Here, the spinel with a cation vacancy concentration of $\delta 2$ transforms to a monoxide with a cation vacancy concentration of $\delta_1$* without losing oxygen. These phases are related by: $\delta_1*=(1+\delta_2)/4$.

A further source of energy storage is the decomposition of the monoxide phase,

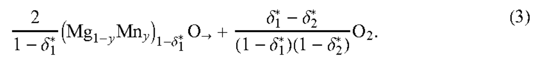

Here, the cation vacancy concentration in the spinel phase changes from $\delta_1$* to $\delta_2$* as the spinel loses oxygen.

The amount of chemical energy storage increases with the amount of oxygen released from the non-stoichiometric monoxide. The defect reaction involves the reduction of $Mn^{3+}$ to $Mn^{2+}$ and the formation of charge-compensating cation vacancies according to the reaction, $$Va''_{Mn}+2Mn^{*}_{Mn}+3O^{x}_{0}\leftrightarrow 2Mn^{x}_{Mn}+2O^{x}_{0}+\tfrac{1}{2}O_2(g) \quad (4)$$

The overall equation for the decomposition of two-phase spinel-monoxide solution to a monoxide phase in an Mg—Mn—O system is given by

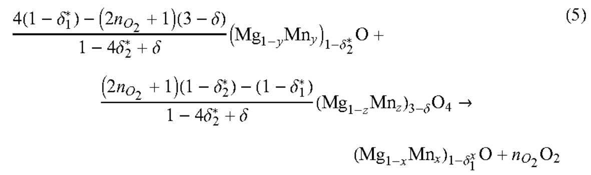

Here $n_{O_2}$ is the number of moles of oxygen released at thermodynamic equilibrium when a spinel-monoxide ($(Mg_{1-y}Mn_y)_{1-\delta_{2*}}O$ and $(Mg_{1-z}Mn_z)_{3-\delta}O_4$) two-phase solid solution is reduced to mole of $(Mg_{1-x}Mn_x)_{1-\delta_{1*}}O$. The overall decomposition, simplifies into the reversible reaction given by

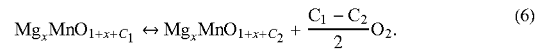

Here x represents the molar ratio of magnesium to manganese in the material and C1 denotes excess oxygen content (i.e. total oxygen atoms−oxygen atoms from x MgO+MnO). Equation (6) does not provide information about the phases present in the chemical reaction; however, if the value of C1 is known (at a given T and $P_{O2}$), then the enthalpy of $MgxMnO_{1+x+C1}$ can be measured using calorimetry. A gravimetric energy storage density and maximum achievable storage efficiency of magnesium-manganese oxides with various manganese-to-magnesium molar ratios can be calculated using the CALPHAD model described in Panda S K, Jung I H, "Critical Evaluation and Thermodynamic Modeling of the Mg—Mn—O (MgO—MnO—$MnO_2$) System," Journal of the American Ceramic Society, 2014 Oct. 1; 97(10):3328-40.

Thermochemical Energy Storage System and Operation

Figure 3:
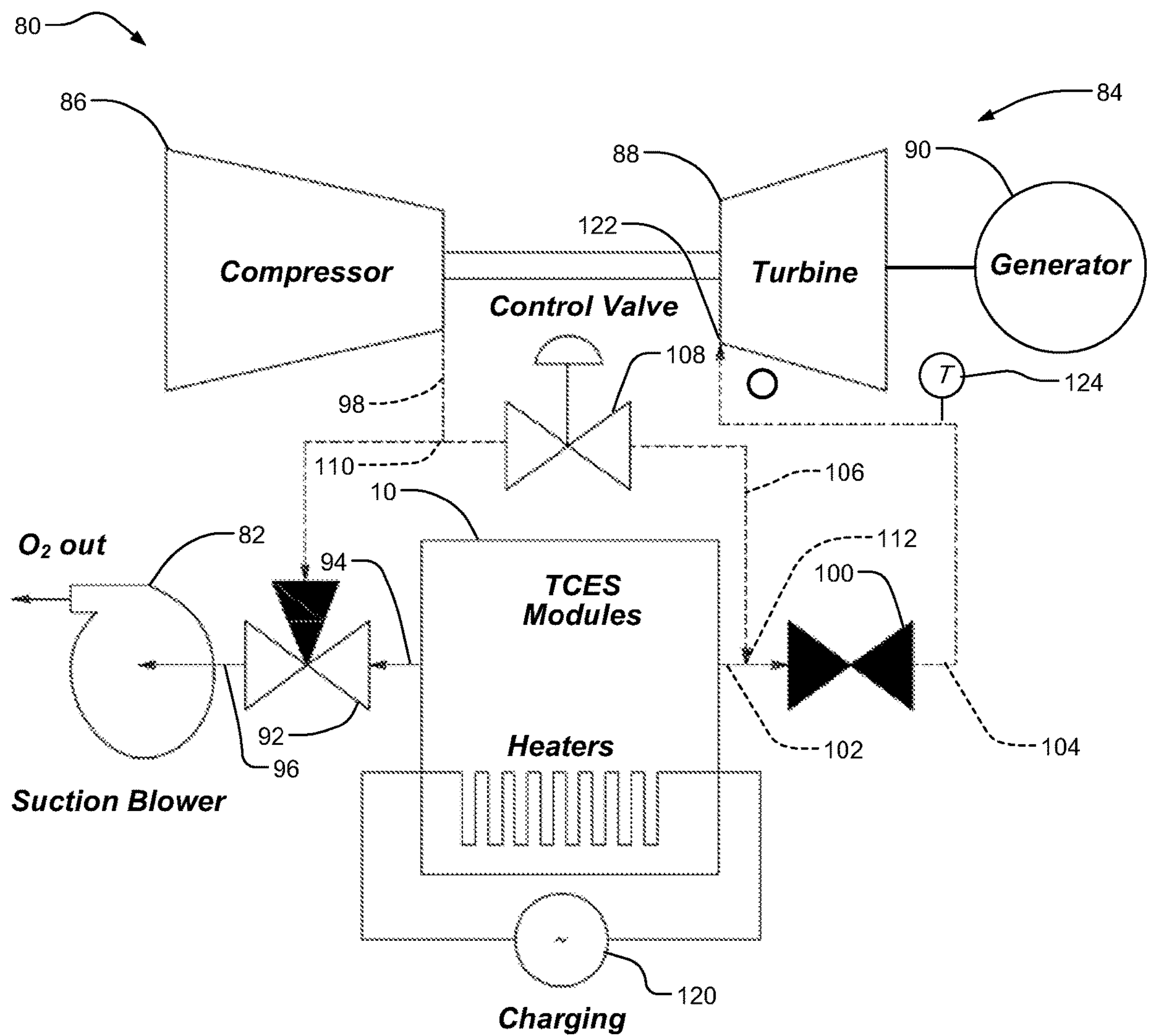
FIG. 3 is a top diagrammatic view showing the present electric-to-electric energy storage system including the present TCES device during an energy storage process.
Figure 4:
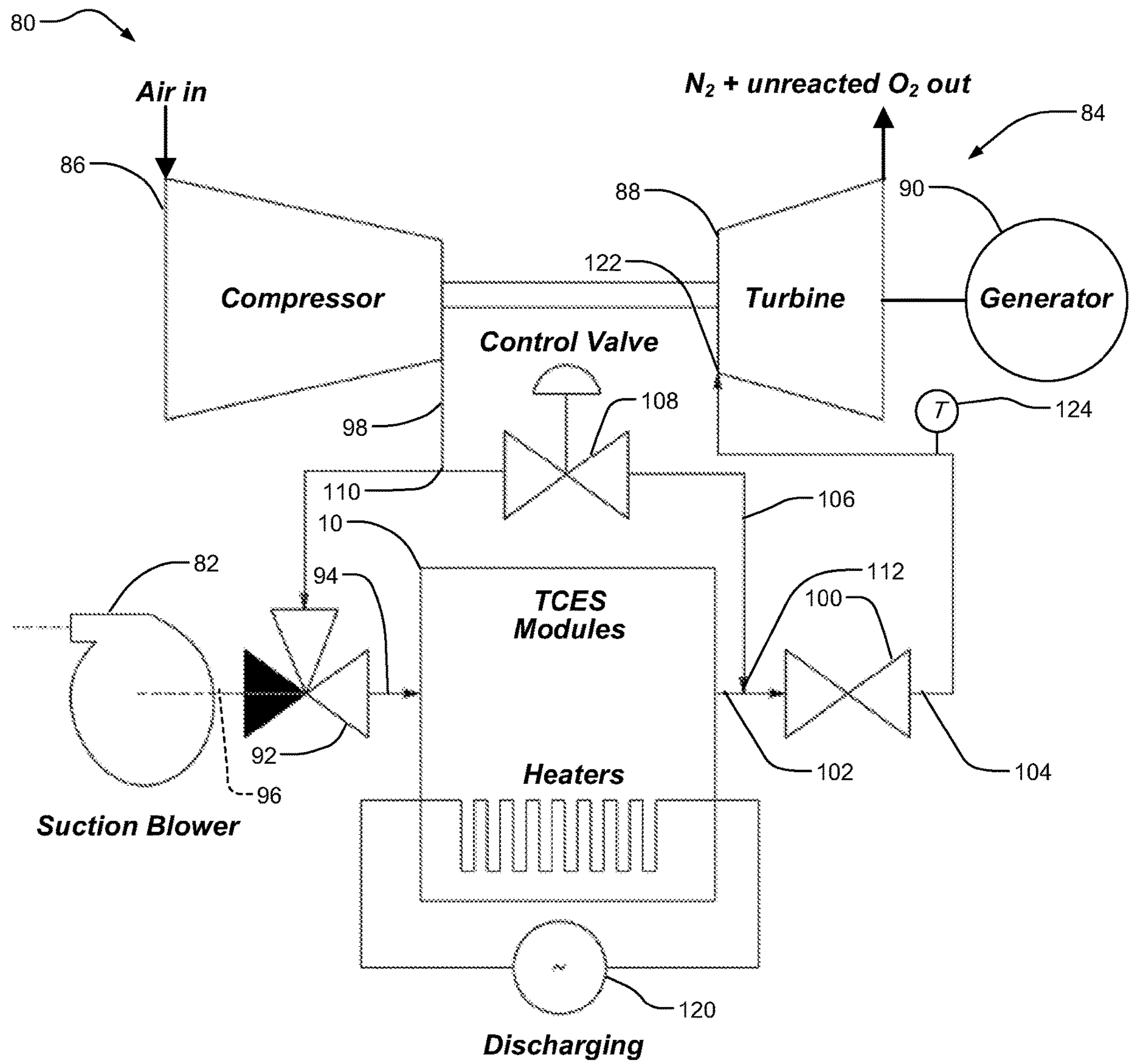
FIG. 4 is a top diagrammatic view showing the present electric-to-electric energy storage system including the present TCES device during an energy release process.

With reference to FIGS. 2 and 3, the TCES device 10 may be used in an electrical-to-electrical energy storage system 80 and operation. The system 80 generally includes the TCES device 10, a blower 82, and a turbo-generator set 84. The turbo-generator set 84 includes a compressor 86, a turbine 88, and an electrical generator 90.

A first valve 92, which is a three-way valve, is fluidly connected to the TCES device 10, the blower 82, and the compressor 86. In a first position, the first valve 92 fluidly connected the TCES device 10 and the blower 82. In a second position, the first valve 92 fluidly connected the TCES device 10 and the compressor 86. A first line 94 (e.g., pipe) is disposed between the first valve 92 and the TCES device 10. A second line 96 is disposed between the first valve 92 and the blower 82. A third line 98 is disposed between the first valve 92 and the compressor 86.

A second valve 100 is disposed between the TCES device 10 and the turbine 88. A fourth line 102 connects the TCES device 10 and the second valve 100. A fifth line 104 connected the second valve 100 and the turbine 88.

In a preferred embodiment, a sixth or bypass line is provided between the third line 98 and the fourth line 102. A third valve 108, which is preferably a variable control valve, is provided on the bypass line 106. At a first junction 110, an outlet gas discharged from the compressor 86 is split into a first portion and a second portion. The first portion is provided to the first valve 92. The second portion is provided to the bypass line 106. At a second junction 112, the second portion is combined with an outlet gas discharged from the TCES device 10 and provided to the second valve 100. An amount of the second portion is controlled by the third valve 108.

The system 80 performs an energy storage operation and an energy recovery operation. In the energy storage operation, electricity is converted to heat to cause the reactive material 12 in the TCES device 10 to be reduced in an endothermic reaction. The reduction reaction generates oxygen, which is removed by the blower 82. In the energy recovery operation, oxygen is provided to the TCES device 10 by the compressor 86 to react with the reactive material 12 in a highly exothermic manner. Accordingly, gas in the TCES device 10 is heated and discharged to the turbine 88, which is used to power the generator 90. In a preferred embodiment, the third valve 108 is operated to allow a portion of the oxygen to bypass the TCES device 10 in order to provide a consistent temperature to the turbine 88.

In a preferred embodiment, the system 80 is modular such that it can be integrated with existing power grids and infrastructure. Furthermore, a quantity of TCES devices 10 can be increased to increase energy storage capacity. In one embodiment, 40-50 TCES devices 10 are stacked to achieve a desired storage capacity.

Energy Storage Operation: Reactive Material Reduction

FIG. 2 depicts the system 80 during the energy storage operation. The system 80 stores energy, for example, when the grid produces excess power. During energy storage, a first valve 92 is in the first position to fluidly connect the blower 82 and the TCES device 10. In a preferred embodiment, the blower 82 is an industrial suction blower. The second valve 100 is in a closed position. The TCES device 10 is fluidly isolated from the compressor 86 and the turbine 88.

A method of storing energy using the system 80 includes electrically connecting the TCES device 10 to an electricity source 120 to heat the heater 16, thereby heating the reactive material 12 (FIG. 1). The reactive material 12 is heated to a reduction temperature of at least about 1000° C., optionally at least about 1100° C., optionally at least about 1200° C., optionally at least about 1300° C., optionally at least about 1400° C., optionally at least about 1500° C., and optionally at least about 1600° C. When the reactive material 12 is heated to at least the reduction temperature, the reactive material 12 is chemically reduced to generate oxygen. In a preferred embodiment, magnesium-manganate oxide spinel is reduced to magnesium oxide and manganese oxide, as described above The method further includes removing the evolved oxygen. The oxygen is removed by the blower 82. In a preferred embodiment, the first opening 38 of the TCES device 10 is fluidly connected to a suction side of the blower 82, with the first valve 92 being disposed therebetween. The blower 82 is operated at a constant oxygen partial pressure. The constant oxygen partial pressure ranges from about 0.01-0.2 atm, and preferably about 0.01-0.1 atm. The evolved oxygen may be collected, such as for sale or use in other processes. In some embodiments, an inert sweep gas may be circulated through the interior volume 36 (not shown). The use of an inert sweep gas may further improve energy density.

Energy Recovery Operation: Oxidation

FIG. 3 depicts the system 80 during the energy recovery operation. The system 80 releases energy, for example, when energy demand exceeds supply. During energy release, the first valve 92 is in the second position to fluidly connect the compressor 86 and the TCES device 10, while fluidly isolating the TCES device 10 from the blower 82. The second valve 100 fluidly connects the turbine 88 and the TCES device 10. The turbine 88 expands heated air/oxygen-rich gas that it receives from the TCES device 10 to power the generator 90, which generates electricity.

A method of releasing energy includes providing oxygen to the interior volume 36 of the TCES device 10. In a preferred embodiment, the compressor 86 is operated to flow pressurized oxygen into the second opening 40 and across and/or through the reactive material 12 (e.g., through the pores of the reactive material). In a preferred embodiment, the oxygen comes from pressurized air. An oxidation pressure of the inlet air ranges from about 20-25 bar. For example, the oxidation pressure ranges from optionally about 20-21 bar, optionally about 21-22 bar, optionally about 22-23 bar, optionally about 23-24 bar, or optionally about 24-25 bar. An oxidation temperature of the inlet air ranges from about 200-400° C. For example, the oxidation temperature may range from optionally about 200-225° C., optionally about 225-250° C., optionally about 250-275° C., optionally about 275-300° C., optionally about 300-325° C., optionally about 325-350° C., optionally about 350-375° C., or optionally about 375-400° C.

The oxygen in the air reacts with the reactive material 12 to chemically oxidize the reactive material 12. In a preferred embodiment, magnesium oxide and manganese oxide react with the oxygen to form magnesium-manganate spinel. The reaction is highly exothermic, and therefore heat is released to the oxygen-depleted air. The reaction continues until substantially all of the reactive material 12 is oxidized.

The amount of heat released to the oxygen-depleted air varies as the oxidation reaction progresses. For example, a first temperature near the beginning of the energy recovery operation may be greater than a second temperature near an end of the energy recovery operation. However, in a preferred embodiment, a turbine temperature at the turbine inlet 122 is substantially constant.

In the preferred embodiment, the system 80 further includes a control unit (not shown). To control the turbine temperature, the third valve 108 allows some of the air leaving the compressor 86 to bypass the TCES device 10 through the bypass line 106. The air in the bypass line 106 admixes with heated, oxygen-depleted air discharged from the second opening 40 of the TCES device 10 at the second junction 112. An admixture air temperature is controlled to meet inlet specifications of the turbine 88. A temperature sensor 124 in the mixture air feeds the control unit, which controls the third valve 108 to moderate the amount of bypass air so that the predetermined turbine inlet temperature is maintained The mixed air is received by the turbine 88 at the turbine inlet 122. The mixed air expands across the turbine 88 to power the generator 90. The generator 90 delivers electricity back to the power grid as needed.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A thermochemical energy storage system comprising:

a vessel including an inlet opening and an outlet opening located in opposite portions of the vessel;

a porous bed located within the vessel, the porous bed comprising a reactive magnesium-manganese oxide material;

the reactive magnesium-manganese oxide material comprising particles with a peripheral diameter of 100 μm-8 mm and pore size of 1-8 mm;

a heater being configured to heat the reactive magnesium-manganese oxide material, the heater comprising spaced apart ceramic electrodes having the porous bed disposed therebetween with the electrodes being located in the opposite portions of the vessel;

the heater being configured to withstand a temperature of the reactive magnesium-manganese oxide material of at least 1500° C.;

the electrodes contacting against the reactive magnesium-manganese oxide material;

at least one blower connected to one of the openings of the vessel;

the electrodes being configured to conduct electricity through the reactive magnesium-manganese oxide material which heats the reactive magnesium-manganese oxide material and generates oxygen within the vessel by a reduction reaction occurring in the porous bed; and the blower being configured to move a gas through the porous bed.

2. The system of claim 1, wherein the heater is embedded within the reactive magnesium-manganese oxide material.

3. The system of claim 1, wherein:

each of the electrodes have a lateral dimension smaller than an inner lateral dimension of the vessel;

there are multiples of the electrode adjacent each opposite portion of the vessel; and each of the electrodes comprise Lanthanum, Strontium and Manganese.

4. The system of claim 1, wherein each of the electrodes are rods and the gas, which is air, flows through or past the electrodes.

5. The system of claim 1, wherein each of the electrodes comprises pellets.

6. The system of claim 1, further comprising:

a turbine actuated by the heated gas from the vessel;

a bypass line connected to the vessel; and a variable control valve associated with the bypass line configured to vary fluid flow therethrough.

7. The system of claim 1, further comprising:

excess electricity generated by a photovoltaic or wind turbine power source, connected to the heater, causing heating of the bed; and the bed being configured to release oxygen upon heating to a reduction temperature and generate heat when exposed to oxygen.

8. The system of claim 1, wherein the reactive magnesium-manganese oxide material is electrically conductive at or greater than 600° C., and the electrodes deter metal oxide formation even at or greater than 600° C.

9. The system of claim 1, further comprising an electrical conductivity-enhancing component, comprising at least one of: pellets, rods or interlinking structures, located within the bed, the component having a higher electrical conductivity than the reactive magnesium-manganese oxide material.

10. The system of claim 1, further comprising an electrically conductive mesh located in the vessel adjacent at least one of the openings.

11. The system of claim 1, further comprising a switch changing electrical conditions during heating of the bed by switching voltages between electrically-disconnected segments of the electrodes.

12. A thermochemical energy storage system comprising:

a vessel including an inlet and an outlet;

a reactive bed located within the vessel, the reactive bed comprising magnesium-manganese oxide particles with a peripheral diameter of 100 μm-8 mm allowing gas flow therethrough between the openings of the vessel;

ceramic electrodes contacting against the reactive material and being configured to withstand a temperature of at least 1500° C.;

the electrodes being configured to conduct electricity through the magnesium-manganese oxide material which heats the reactive magnesium-manganese oxide material.

13. The system of claim 12, wherein:

each of the electrodes comprise Lanthanum, Strontium and Manganese; and the reactive bed has a total porosity of less than or equal to about 70%.

14. The system of claim 12, further comprising:

a turbine actuated by the heated gas from the vessel;

a bypass line connected to the vessel; and a variable control valve associated with the bypass line configured to vary fluid flow therethrough.

15. The system of claim 12, further comprising:

excess electricity generated by a photovoltaic or wind turbine power source, connected to at least one of the electrodes, causing heating of the bed; and the bed being configured to release oxygen upon heating to a reduction temperature and generate heat when exposed to oxygen.

16. The system of claim 12, wherein the electrodes conduct electricity through the magnesium-manganese oxide particles at or greater than 600° C., and the electrodes deter metal oxide formation even at or greater than 600° C.

17. The system of claim 12, further comprising multiple layers of insulation located between the bed and a shell of the vessel, at least one of the layers of the insulation comprising refractory bricks, and another of the layers of the insulation comprising an alumina, silica or zirconia material.

18. The system of claim 12, further comprising an electrically conductive mesh located in the vessel and being in contact with the bed.

19. The system of claim 12, further comprising a switch changing electrical conditions during heating of the bed by switching voltages between electrically-disconnected segments of the electrodes.

20. A thermochemical energy storage system comprising:

a vessel including an inlet and an outlet;

a reactive bed located within the vessel;

electrodes contacting against and conducting electricity through the reactive bed;

at least one blower moving a gas through the reactive bed;

a turbine actuated by the gas, which is heated, flowing from the outlet of the vessel;

a generator creating electricity in response to actuation of the turbine;

a bypass line connected to the vessel; and a control valve associated with the bypass line configured to vary fluid flow therethrough;

the reactive bed being configured to release oxygen upon being heated to a reduction temperature, and generate heat when exposed to oxygen.

21. The system of claim 20, wherein each of the electrodes comprise Lanthanum, Strontium and Manganese.

22. The system of claim 20, wherein the gas is air and the electrodes are adjacent end caps of the vessel, and the inlet and the outlet are in the end caps.

23. The system of claim 20, further comprising excess electricity generated by a photovoltaic or wind turbine power source, connected to at least one of the electrodes, causing heating of the reactive bed.

24. The system of claim 20, wherein the electrodes conduct electricity through the reactive bed, which comprises magnesium-manganese oxide particles, at or greater than 600° C.

25. The system of claim 20, further comprising multiple layers of insulation located between the reactive bed and a shell of the vessel, at least one of the layers of the insulation comprising refractory bricks, and another of the layers of the insulation comprising an alumina, silica or zirconia material.

26. The system of claim 20, further comprising an electrically conductive mesh located in the vessel and being in contact with the reactive bed, the electrodes and the mesh being configured to withstand temperatures of at least 1500° C.

27. The system of claim 20, further comprising a switch changing electrical conditions during heating of the reactive bed by switching voltages between electrically-disconnected segments of the electrodes.

28. The system of claim 20, further comprising apertures extending through a set of the electrodes to allow the gas to flow therethrough.

29. The system of claim 20, wherein:

the electrodes heat the reactive bed by resistive heating while conducting electricity through the reactive bed;

the reactive bed comprises granular particles in a packed and porous arrangement, the particles are reusable for at least one thousand reduction energy storage and heating cycles without degradation in performance; and the electrodes comprise a ceramic material.

30. A thermochemical energy storage system comprising:

a porous and packed bed comprising a reactive magnesium-based material;

electrodes having the reactive material disposed therebetween, the electrodes comprising a ceramic material;

the electrodes heat the reactive bed by resistive heating while conducting electricity through the reactive material;

the reactive material being reusable for at least one thousand reduction energy storage and heating cycles without degradation in performance;

the electrodes being configured to withstand a temperature of at least 1500° C.; and at least one blower configured to blow air through the reactive material;

the reactive material being configured to release oxygen and store energy upon being heated to a reduction temperature, and generate heat when exposed to oxygen.

31. The system of claim 30, wherein each of the electrodes comprise Lanthanum, Strontium and Manganese.

32. The system of claim 30, further comprising:

a vessel comprising an outer shell and end caps, the bed being located within the vessel;

the blower blowing air, which includes the oxygen, into an inlet of one of the end caps;

the electrodes being located adjacent the end caps;

a turbine; and air, heated by the reactive material, flowing from an outlet in one of the end caps to actuate the turbine.

33. The system of claim 30, further comprising excess electricity generated by a photovoltaic or wind turbine power source, connected to at least one of the electrodes, causing heating of the reactive material.

34. The system of claim 30, wherein the reactive material comprises magnesium-manganese oxide particles, having a peripheral diameter of 100 μm-8 mm and pore size of 1-8 mm.

35. The system of claim 30, further comprising:

a vessel containing the bed;

a turbine actuated by gas heated from the reactive material which flows to the turbine;

a bypass line connected to the vessel; and a variable control valve associated with the bypass line configured to vary fluid flow therethrough.

36. The system of claim 30, further comprising:

a turbine;

a controller;

an air temperature sensor connected to the controller; and a valve, varied by the controller, moderating air flow and/or air mixing, to maintain a predetermined temperature of the air flowing from the reactive material to the turbine.

* * * * *